E. W. EDWARDS.
BODY FOR MOTOR CARS AND OTHER MOTOR AND RAILWAY VEHICLES.
APPLICATION FILED JUNE 10, 1920.
1,396,737.
Patented Nov. 15, 1921.
4 SHEETS—SHEET 1.
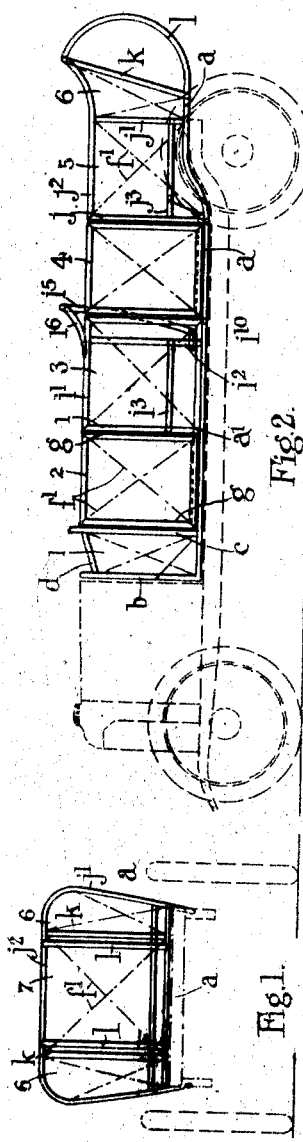
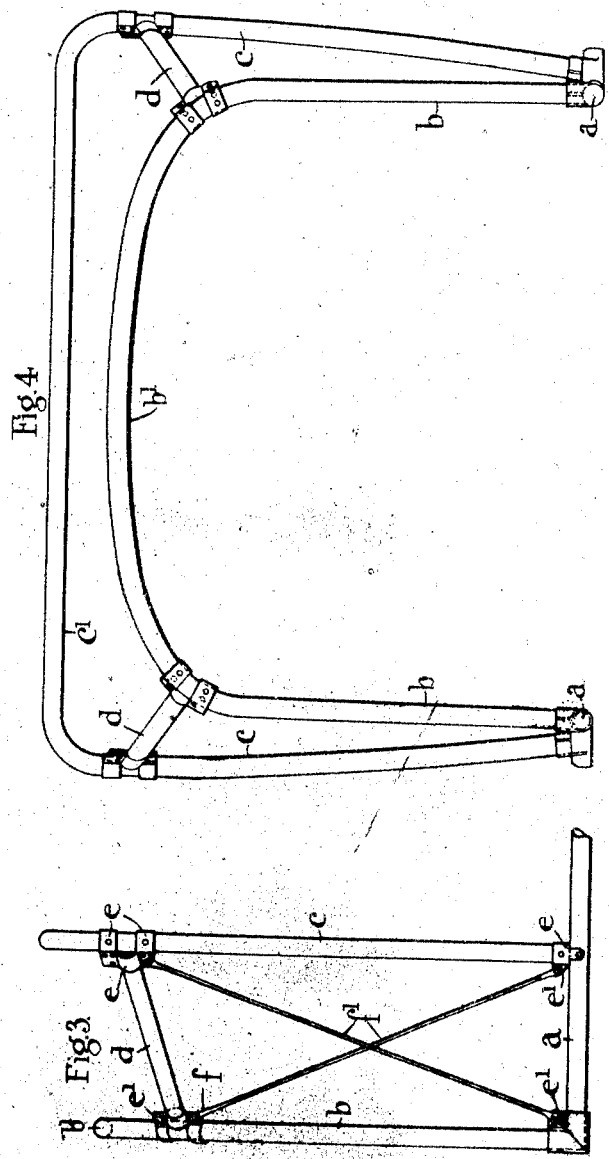

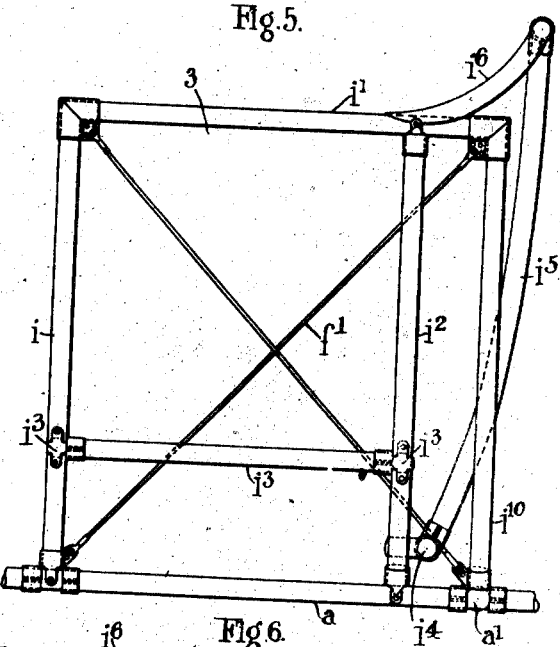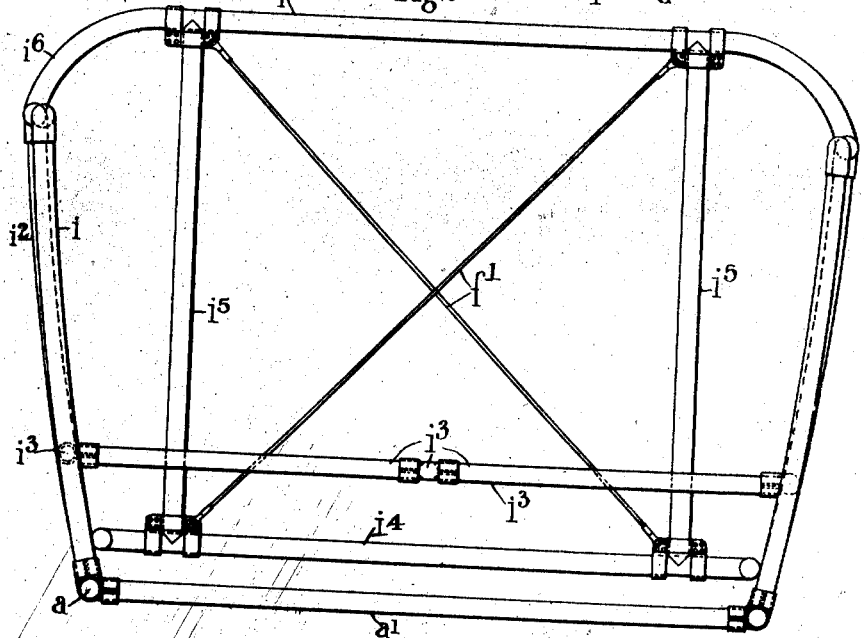

E. W. EDWARDS.
BODY FOR MOTOR CARS AND OTHER MOTOR AND RAILWAY VEHICLES.
APPLICATION FILED JUNE 10, 1920.
1,396,737.
Patented Nov. 15, 1921.
4 SHEETS—SHEET 3.
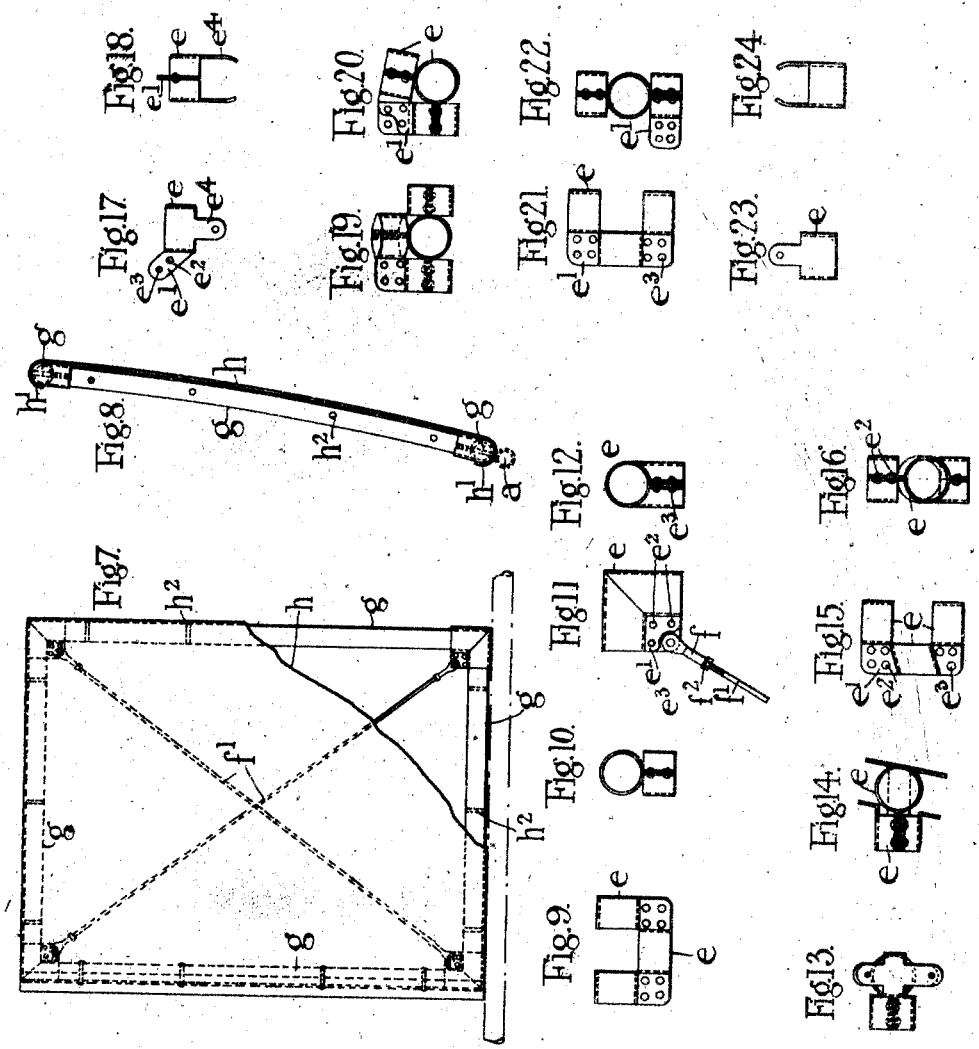

E. W. EDWARDS.
BODY FOR MOTOR CARS AND OTHER MOTOR AND RAILWAY VEHICLES.
APPLICATION FILED JUNE 10, 1920.
1,396,737.
Patented Nov. 15, 1921.
4 SHEETS—SHEET 4.
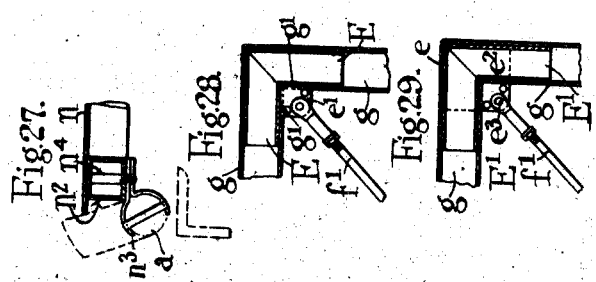
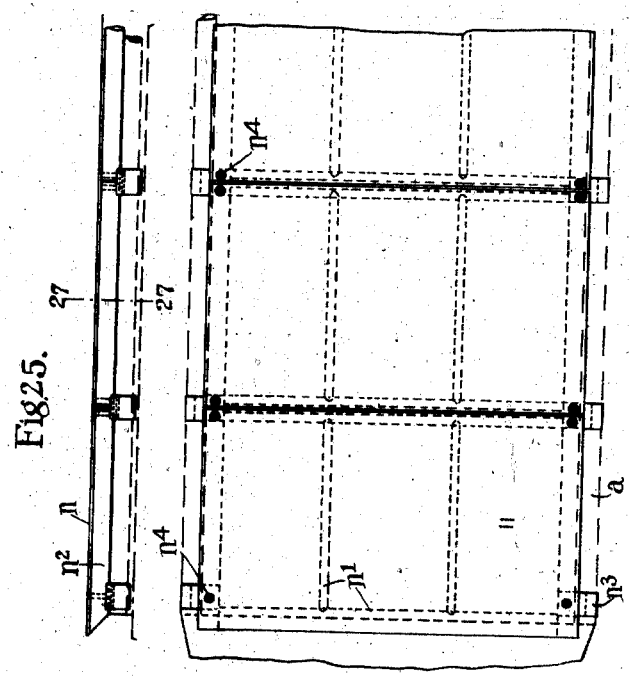

UNITED STATES PATENT OFFICE.

ERNEST WILLIAM EDWARDS, OF CARSHALTON, ENGLAND.

BODY FOR MOTOR-CARS AND OTHER MOTOR AND RAILWAY VEHICLES.

1,396,737.   Specification of Letters Patent.   Patented Nov. 15, 1921.

Application filed June 10, 1920.  Serial No. 388,007.

*To all whom it may concern:*

Be it known that I, ERNEST WILLIAM EDWARDS, a subject of the King of Great Britain, residing at "Mossley," Denmark Road, Carshalton, in the county of Surrey, England, have invented certain new and useful Improvements in Bodies for Motor-Cars and other Motor and Railway Vehicles, of which the following is a full, clear, and exact description.

The object of the present invention is to construct an improved body for a motor car or other vehicle which is rigid, light and strong, which is readily manufactured in large quantities, which affords special facilities for repairs in case of accident and which is, apart from the upholstery, fireproof.

According to the present invention the body of the car or other vehicle is composed of sections each of which generally speaking has four tubes. In some cases adjacent sections have one tube common to both of them.

The sides of motor vehicles usually slope inward toward the lower part, the sides of the cowl usually slope toward each other at the front and the rear of the body is usually curved in plan. All such features can be readily obtained by varying the shapes of the sections. Many of the sections are roughly rectangular in side elevation but others especially those forming the rear of the body are considerably wider at the upper part than at the lower part.

The tubes are formed into sections by means of externally or internally fitting lugs which are preferably stamped up from blanks cut out of sheet metal. Such lugs not only connect the ends of adjacent tubes or connect the end of one tube to another tube intermediate of its ends but they are in most cases formed as clamps. For this purpose each lug is formed integral with ears or small plates which are riveted together thus retaining the lug in correct shape to closely encircle part of a tube. These ears or small plates also serve as means for attaching struts or stay rods to the lugs.

When employing internally fitting lugs they are also provided with ears or other means for the attachment of struts or stay rods.

The stay rods are preferably screw threaded at their ends to receive short fittings which are forked at their ends to fit on both sides of the ears or plates or some of them which have been riveted together. The fittings may be screwed more or less on to the stay rods so that these latter are in tension when riveted or bolted to the ears or plates. Lock nuts are preferably provided to fix the fittings on the stay rods. The stay rods connect opposite angles of each section and hold the lugs securely on or in the ends of the tubes thus forming a rigid structure.

The metal panels are bent at their edges to fit partly around the tubes and are secured thereto by means of pins. In the case of an accident such pins having but small heads can be readily removed thus releasing the panel after which it is only necessary to detach the two stay rods each at one end to enable the whole section to be taken to pieces as the lugs can be withdrawn from the tubes or vice versa. The tubes, panel or lugs can then be bent to their original shapes or they can be replaced by new parts without disturbing the rest of the body. All the parts being made by machinery can be easily replaced at small cost.

Some of the lugs are made of two or more stampings which are connected by the ears or small plates above mentioned. Some of the lugs are designed to connect three tubes at one point and have two sockets or entering parts to receive or enter two of the tubes and projections carried by the sockets or entering parts to be pinned or riveted to the third tube. When one tube is connected to another tube intermediate of its ends the lugs are preferably pinned to the last mentioned tube. The cowl is formed by front and back tubes each having more or less vertical members connected at their upper ends the one by a curved portion and the other by curved ends and a straight central part. These two tubes are fixed to the bottom tube of the body by suitable lugs and they are connected at or about the tops of the vertical portions of the tubes by other tubes which slope preferably converge toward the front of the cowl.

The seat supports are formed as separate sections similar to those already described and are connected to the sides of the body by three way lugs or double lugs with projections.

The doors are likewise made as separate sections.

The floor of the body is formed of separate sheets or strips of metal each having strengthening flanges. The ends of these plates are supported by the lower tube or tubes of the body and are fixed thereto in any suitable manner.

The invention is illustrated in the accompanying drawings in which Figure 1 is a rear elevation of the body of a motor car and Fig. 2 is a side elevation of the same. In these views the lugs are omitted and the stay rods, the wheels, chassis, bonnet and radiator are indicated in broken lines.

Fig. 3 is a side elevation and Fig. 4 is a front elevation of the cowl.

Fig. 5 is a side elevation and Fig. 6 is a front elevation of the front seat support.

Fig. 7 is a side elevation of the body of the door and Fig. 8 is a front elevation of the same.

Figs. 9 and 10 are a side elevation and a front elevation of a lug for connecting one tube intermediate of the ends of a second tube in the same plane.

Figs. 11 and 12 are a side elevation and a front elevation of a lug for connecting the corners of one section.

Figs. 13 and 14 are a side elevation and a front elevation of a lug for connecting the ends of two tubes in one plane with another tube or tubes at an angle to said plane.

Figs. 15 and 16 are a side elevation and a front elevation of a lug for connecting the end of a tube at an angle to a vertical tube and intermediate of its ends.

Figs. 17 and 18 are a side elevation and a front elevation of a lug for receiving the end of a vertical tube and pinning it in position on a horizontal tube.

Figs. 19 and 20 are a side elevation and a front elevation of a lug for connecting two tubes in a horizontal plane with an uprising tube at an angle to the vertical.

Figs. 21 and 22 are a side elevation and a front elevation of a lug somewhat similar to that shown in Figs. 9 and 10 but provided with an extra ear enabling it to be stayed in different planes at right angles to each other.

The lugs shown in Figs. 9 to 22 are all stamped up from one or more pieces of sheet metal.

Figs. 23 and 24 are a side elevation and a front elevation of a lug for connecting intermediate of its ends a horizontal upper tube with the upper end of a lower vertical tube. This lug is made by milling or stamping part of a tube which is circular in cross section.

Fig. 25 is a side elevation of some floor plates and Fig. 26 is a plan of the same. Fig. 27 is a cross section on the line 27—27 of Fig. 25 to an enlarged scale.

Fig. 28 is a section of an internally fitting lug, and of two tubes connected thereby. Fig. 29 is a section showing another form of internally fitting lugs and of two tubes connected thereby.

As seen in Fig. 2 the side of the body including the doors and the cowl is formed of five sections marked 1, 2, 3, 4, and 5 and the rear of the body as shown in Fig. 2 is formed of three sections two of which are marked 6 and one 7. The sections 2, 3, and 4 are rectangular in side elevation, sections 2 and 4 being doors. Section 1 which is the side of the cowl is not quite rectangular as it has a downwardly sloping top tube and section 5 is not rectangular as it has a curved lower tube but this latter joins the rear vertical member at a right angle and joins the front vertical member at an angle slightly less than a right angle.

At the rear of the body the central section 7 is rectangular as seen from the rear and sections 6, 6 are of irregular shape the front and rear members converging toward the lower part of the section, the lower member being horizontal and the upper member curving upward toward the rear. This section however consists of four tubes connected by detachable lugs at the corners and connected diagonally by transverse struts or stay rods like the sections which are truly rectangular in elevation.

The body has a single lower tube $a$ which passes along each side and around the back and is common to all the sections. The two side members of the tube $a$ are connected laterally by cross tubes $a^1$.

The cowl consists of a front tube having approximately vertical members $b$ $b$ connected at their upper parts by a curved part $b^1$. a rear tube having approximately vertical members $c$ connected by curved ends to a straight part $c^1$, two inclined tubes $d$ $d$ and parts of the lower tube $a$.

The tubes $a$ and $b$ are connected by a lug similar to that shown in Figs. 11 and 12. The tubes $a$ and $c$ are connected by a lug similar to that shown in Figs. 17 and 18. The tubes $b$ and $d$ are connected by a lug similar to that shown in Figs. 15 and 16 but turned upside down and the tubes $c$ and $d$ are connected by a lug similar to that shown in Figs. 15 and 16. These lugs have tubular parts $e$ which are split and connected by means of ears $e^1$ which are riveted together at $e^2$ and thus accurately fit or tightly grip the tubes. To these ears at $e^3$ are bolted or riveted the forked fittings $f$ which are threaded in their interior and are screwed onto the ends of the stay rods $f^1$. The lug shown in Figs. 17 and 18 has only one tubular part $e$ which carries projections $e^4$ by which it is pinned onto the lower tube $a$. A fitting $f$ is shown more clearly in Fig. 11 connecting the lug to a stay rod $f^1$. which latter is provided with a lock nut $f^2$.

The doors each consist as shown more clearly in Figs. 7 and 8, of four tubes $g$ connected by lugs such as shown in Figs. 11 and 12 and these latter are connected diagonally by stay rods $f^1$. The door is shown covered with a metal panel $h$ which is bent at its edges at $h^1$ to fit partly around the tubes $g$ and is secured thereto by means of pins $h^2$. The other sections are covered with metal panels in like manner.

Section 3 of the body forms the front seat support and is shown more clearly in Figs. 5 and 6. It consists of two vertical tubes $i$, $i^{10}$ and a horizontal tube $i^1$ connected by lugs. The tubes $i$, $i^{10}$ are connected by other lugs to the lower tube $a$ and said lugs are connected diagonally by stay rods $f^1$. An additional vertical tube $i^2$ is provided at each side which is connected by lugs to the upper member $i^1$ and to the lower member $a$. This tube $i^2$ and the front tube $i$ support seat tubes $i^3$ which form rectangular sections, the opposite lugs of which are connected by diagonal stay rods such as $f^1$.

The tube $i^2$ also supports a horizontal tube $i^4$ to which latter are connected back tubes $i^5$ by suitable lugs. A curved tube $i^6$ is fixed at its ends to the upper members $i^1$ and is connected intermediate of its ends by suitable lugs to the tops of the back tubes $i^5$. The tubes $i^4$, $i^5$, $i^6$, form a rectangular section the lugs of which are connected diagonally by stay rods $f^1$ as shown in Fig. 6. Section 5 is composed of vertical tubes $j$, $j^1$, a top tube $j^2$ and the main lower tube $a$. These are connected by lugs and cross stays $f^1$. The tubes $j^2$, $j$, $a$ are connected in a similar manner to the tubes $i^1$, $i$ and $a$ forming part of section 3. In section 5 the seat tubes are marked $j^3$ and are are supported by lugs such as shown in Figs. 13 and 14 from the tubes $j$ $j^1$.

Section 6 is composed of the top tube $j^2$, the vertical tube $j^2$, the inclined tube $k$ and the main bottom tube $a$. It will be noticed that one tube $j^1$ is common to sections 5 and 6 and that the tube $j^2$ passes along the tops of sections 5 and 6.

Section 7 is composed of the top tube $j^2$ the inclined tubes $k$ and the bottom tube $a$ all connected by lugs which latter are connected by cross stays $f^1$. This section is located in the same inclined plane as the tubes $k$ $k$ and only its edge formed by a tube $k$ can be seen in Fig. 2. The tube $j^2$ is common to two sections 5, two sections 6, and the section 7.

The two curved tubes $l$, $l$ connected to the top tube $j^2$ and bottom tube $a$ do not form a section of the body but are merely employed to carry the curved panel at the rear of the car. In some forms of bodies these tubes $l$, $l$ would be less curved and if desired they may be omitted and the back panel may be carried by section 7.

The floor of the body as shown in Figs. 25, 26 and 27 is formed of separate metal sheets or plates $n$ having strengthening flanges or ribs $n^1$. The ends of these plates $n$ as shown are supported by square tubes $n^2$ which latter are provided with clamps $n^3$ passing partly around the opposite members of the bottom tube $a$. Instead of tubes $n^2$ angle irons may be employed. The plates $n$, the tubes $n^2$ or angle irons and the clamps $n^3$ may all be connected by screws $n^4$ and the jaws of each clamp $n^3$ may be pinned or riveted to the bottom tube $a$ as seen in Fig. 27.

It will be understood that some or all of the tubes forming the body may be of square section as the split lugs and other lugs shown may be readily made to fit square tubes. The split lugs will grip square tubes and those lugs which have projections may be readily pinned to square tubes.

The two side members of the tube $a$ and the cross tubes $a^1$ form rectangular sections the lugs of which are connected diagonally by stay rods $f^1$ as in the other sections shown.

The top tube $j^2$ which is above described as common to the two side sections 5, 5, the two back sections 6, and the back section 7 made in separate parts connected by lugs at the tops of the tubes $j^1$ and $k$.

The bottom tube $a$ may also be made in separate parts connected by lugs at the junctions with the vertical and inclined tubes.

The lugs shown in Figs. 3 to 24 are all externally fitting lugs. In place of such lugs, or some of them clasping the tubes and held in position by cross rods I may employ internally fitting lugs entering the tubes and also held in position and secured by the cross rods above described.

Such an internally fitting lug is shown in Fig. 28. It is somewhat similar to the lug shown in Figs. 11 and 12 but has extensions E beyond the ears $e^1$. These extensions E are adapted to enter and fit the ends of tubes $g$. In order that the tubes $g$ may be better secured and to provide a neater finish each tube $g$ is preferably split for a short distance from its end at $g^1$ so that it may pass over the ears $e^1$. The tubes $g$ are also preferably cut off at an angle of 45° so that their ends abut and provide a better seating for a metal panel.

The lug shown in Fig. 29 is exactly like that shown in Figs. 11 and 12 but is provided with two liners which project at $E^1$ beyond the lug and enter the ends of tubes $g$. In this construction the tubes $g$ abut against the ends of the lug $e$. This construction provides a neat finish for the corner of a section and a good seating for the metal covering panel.

The lugs shown in Figs. 28 and 29 are provided with ears $e^1$ to which cross rods $f^1$ are connected as described with respect to other figures.

It will be obvious that some of the other connecting lugs or fittings may in like manner be formed to enter the tubes instead of clasping them.

It will be understood that the drawings merely show the invention applied to one form of open motor car body and that other forms of open bodies and closed bodies for motor cars may be constructed in sections upon the same principle.

It will also be understood that the bodies of railway and other vehicles may be constructed according to the present invention.

What I claim as my invention is:—

1. A body for motor and other vehicles made in sections, each section having tubes, lugs by which the adjacent ends of the tubes are connected, stay rods in tension by which the lugs are held in position with respect to the tubes, metal panels attached to the sections by bending them around the tubes and pins by which the panels are fixed to the tubes, substantially as set forth.

2. A body for motor and other vehicles made in sections, each section having tubes, lugs by which the adjacent ends of the tubes are connected, stay rods in tension by which the lugs are held in position with respect to the tubes, metal panels attached to the sections by bending them around the tubes, pins by which the panels are fixed to the tubes, metal plates forming the floor, tubular rigid members supporting the ends of the said metal plates and clamps fixed to said tubular rigid members, the jaws of said clamps being pinned to the lower tubes of the sections of the body, substantially as set forth.

3. A body for motor or other vehicles made in side sections comprising the side of the cowl, the doors and the sides of the body, transverse sections and other sections forming supports for the seats, each section having tubes, lugs by which the adjacent ends of the tubes are connected, stay rods in tension by which the lugs are held in position with respect to the tubes, metal panels attached to the side and rear sections by bending them around the tubes and pins by which the panels are fixed to the tubes, substantially as set forth.

In witness whereof I have set my hand.

ERNEST WILLIAM EDWARDS.